(12) United States Patent
Parnin et al.

(10) Patent No.: US 10,711,642 B2
(45) Date of Patent: Jul. 14, 2020

(54) GAS TURBINE ENGINE LUBRICATION SYSTEM AND APPARATUS WITH BOOST PUMP SYSTEM

(71) Applicant: United Technologies Corporation, Farmington, CT (US)

(72) Inventors: Francis Parnin, Suffield, CT (US); Alan J. Goetschius, Amston, CT (US); Thomas B. Avis, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 382 days.

(21) Appl. No.: 15/475,736

(22) Filed: Mar. 31, 2017

(65) Prior Publication Data

US 2018/0283211 A1 Oct. 4, 2018

(51) Int. Cl.
| *F01D 25/16* | (2006.01) |
| *F01D 25/20* | (2006.01) |
| *F01D 19/00* | (2006.01) |
| *F02K 3/06*  | (2006.01) |

(52) U.S. Cl.
CPC .......... *F01D 25/164* (2013.01); *F01D 19/00* (2013.01); *F01D 25/20* (2013.01); *F02K 3/06* (2013.01); *F05D 2220/32* (2013.01); *F05D 2240/60* (2013.01); *F05D 2260/96* (2013.01); *F05D 2260/98* (2013.01)

(58) Field of Classification Search
CPC ......... F01D 25/164; F01D 19/00; F01D 25/20
See application file for complete search history.

(56) References Cited

U.S. PATENT DOCUMENTS

| 3,446,483 | A | * | 5/1969 | Townsend | ............... F01D 17/26 |
| | | | | | 415/43 |
| 4,211,070 | A | | 7/1980 | Portmann | |
| 4,926,641 | A | * | 5/1990 | Keller | .................... F01D 25/20 |
| | | | | | 184/6.13 |
| 4,947,639 | A | | 8/1990 | Hibner et al. | |

(Continued)

FOREIGN PATENT DOCUMENTS

JP S62107206 A 5/1987

OTHER PUBLICATIONS

JP62107206—Machine translation (Year: 1987).*
EP search report for EP18165527.5 dated Jul. 17, 2018.

*Primary Examiner* — Michael A Riegelman
(74) *Attorney, Agent, or Firm* — Getz Balich LLC

(57) ABSTRACT

A lubrication system for a gas turbine engine is provided. The lubrication system includes a supply source of a fluid lubricant, a main supply pump, and a boost pump system. The main supply pump has an MSP fluid flow inlet port and an MSP fluid flow exit port. The main supply pump is configured to receive a source fluid lubricant flow at a first pressure, and configured to produce a supply fluid flow at a second pressure. The second pressure is greater than the first pressure. The boost pump system has a boost pump having a BP fluid flow inlet port, and a BP fluid flow exit port. The boost pump system is configured so that the boost pump selectively receives at least a portion of the supply fluid flow from the main supply pump at the BP fluid flow inlet port, and the boost pump is configured to produce a boost supply fluid flow at a third pressure at the BP fluid flow exit port, wherein the third pressure is greater than the second pressure.

13 Claims, 8 Drawing Sheets

(56) References Cited

U.S. PATENT DOCUMENTS

| | | | | |
|---|---|---|---|---|
| 4,983,051 | A | 1/1991 | Hibner et al. | |
| 5,110,257 | A * | 5/1992 | Hibner | F01D 25/164 |
| | | | | 415/119 |
| 5,911,678 | A | 6/1999 | White | |
| 7,509,793 | B2 * | 3/2009 | Tumelty | F01D 25/20 |
| | | | | 60/39.08 |
| 7,692,347 | B2 | 4/2010 | Nakajima | |
| 8,511,055 | B2 | 8/2013 | DiBenedetto et al. | |
| 8,881,870 | B2 * | 11/2014 | Cornet | F01D 25/20 |
| | | | | 184/6.11 |
| 9,494,048 | B1 | 11/2016 | Parnin | |
| 2003/0230274 | A1 * | 12/2003 | Williams | F01M 1/02 |
| | | | | 123/196 R |
| 2008/0093173 | A1 * | 4/2008 | James | F01D 25/18 |
| | | | | 184/6.11 |
| 2010/0294371 | A1 * | 11/2010 | Parnin | F16K 17/36 |
| | | | | 137/1 |
| 2010/0294597 | A1 | 11/2010 | Parnin | |
| 2011/0108360 | A1 * | 5/2011 | DiBenedetto | F01D 25/18 |
| | | | | 184/6.11 |
| 2011/0297485 | A1 * | 12/2011 | Sheridan | F01D 25/18 |
| | | | | 184/6.12 |
| 2012/0241258 | A1 * | 9/2012 | Subramaniam | F16N 7/40 |
| | | | | 184/6.4 |
| 2013/0318940 | A1 * | 12/2013 | Parnin | F02C 7/06 |
| | | | | 60/39.08 |
| 2014/0090930 | A1 * | 4/2014 | James | F01D 25/20 |
| | | | | 184/6.11 |
| 2014/0150439 | A1 * | 6/2014 | Parnin | F02C 7/06 |
| | | | | 60/772 |
| 2016/0032772 | A1 * | 2/2016 | Sheridan | F01D 25/20 |
| | | | | 416/171 |
| 2016/0215652 | A1 * | 7/2016 | Mastro | F01D 25/20 |
| 2016/0245117 | A1 * | 8/2016 | Parnin | F01D 25/20 |
| 2016/0305284 | A1 * | 10/2016 | Mastro | F01D 25/20 |
| 2016/0376949 | A1 * | 12/2016 | Parnin | F01M 11/10 |
| | | | | 73/112.01 |
| 2017/0114662 | A1 * | 4/2017 | Mastro | F01D 25/20 |
| 2017/0114784 | A1 * | 4/2017 | Parnin | F01D 25/20 |
| 2017/0122330 | A1 * | 5/2017 | Mastro | F01D 25/20 |
| 2017/0362959 | A1 * | 12/2017 | Suciu | F01D 25/20 |
| 2018/0066552 | A1 * | 3/2018 | Waddleton | F01M 11/03 |
| 2018/0073395 | A1 * | 3/2018 | Parnin | F01D 15/12 |
| 2018/0128124 | A1 * | 5/2018 | Avis | F01D 5/02 |
| 2018/0216485 | A1 * | 8/2018 | Tsunekawa | F01D 17/10 |
| 2018/0230854 | A1 * | 8/2018 | Parnin | F01D 25/18 |
| 2018/0283211 | A1 * | 10/2018 | Parnin | F01D 19/00 |
| 2018/0306062 | A1 * | 10/2018 | Avis | F16N 7/02 |
| 2019/0170294 | A1 * | 6/2019 | Wilson | F01D 15/12 |

* cited by examiner

GAS TURBINE ENGINE LUBRICATION SYSTEM AND APPARATUS WITH BOOST PUMP SYSTEM

BACKGROUND OF THE INVENTION

1. Technical Field

This disclosure relates generally to a gas turbine engine lubrication systems and methods and more particularly to gas turbine engine lubrication systems and methods for use with fluid damped structures.

2. Background Information

Gas turbine engines are often configured to include a fan section, a low pressure compressor section, a high pressure compressor section, a combustor section, a low pressure turbine section, a high pressure turbine section, a low speed spool, and a high speed spool. The fan section may be configured to drive air along a bypass flow path, while the compressor section drives air along a core flow path for compression and communication into the combustor section then expansion through the turbine section. The low speed spool and the high speed spool are mounted for rotation about an engine central longitudinal axis relative to an engine static structure via several bearing systems. The low speed spool generally interconnects the fan section, the low pressure compressor section and the low pressure turbine section. The high speed spool generally interconnects the high pressure compressor section and the high pressure turbine section. The combustor section is disposed between the high pressure compressor section and the high pressure turbine section.

Under normal operating conditions, a shaft section of a spool (e.g., a shaft section of the high speed spool) will rotate without significant vibration. Under certain operating conditions, however, a spool shaft section may be subject to cyclical, orbital motion which can lead to undesirable vibration. Such cyclical, orbital motion may be the product of temporary thermal bowing of the spool shaft section as a result of a thermal gradient within the engine. Once the thermal gradient sufficiently dissipates, the temporary bowing dissipates and the spool shaft section restores itself to normal operating condition.

As will be appreciated by those skilled in the art, the existence of an imbalance in a spool shaft section may result in a greatly increased demand on the bearing components to restrain the movement of the rotating member or shaft and to transfer the lateral forces induced by the imbalance into the machinery mounting structure.

SUMMARY OF THE DISCLOSURE

According to an aspect of the present disclosure, a lubrication system for a gas turbine engine having a plurality of components is provided. The lubrication system includes a supply source of a fluid lubricant, a main supply pump, and a boost pump system. The main supply pump has at least one fluid flow inlet port ("MSP fluid flow inlet port") in fluid communication with the supply source of fluid lubricant, and at least one fluid flow exit port ("MSP fluid flow exit port") in fluid communication with the plurality of engine components. The main supply pump is configured to receive a source fluid lubricant flow from the supply source at a first pressure at the MSP fluid flow inlet port, and configured to produce a supply fluid flow at a second pressure at the MSP fluid flow exit port. The second pressure is greater than the first pressure. The boost pump system has a boost pump having at least one fluid flow inlet port ("BP fluid flow inlet port") in selective fluid communication with MSP fluid flow exit port, and at least one fluid flow exit port ("BP fluid flow exit port") in selective fluid communication with at least one of the plurality of engine components. The boost pump system is configured so that the boost pump selectively receives at least a portion of the supply fluid flow from the main supply pump at the BP fluid flow inlet port, and the boost pump is configured to produce a boost supply fluid flow at a third pressure at the BP fluid flow exit port, wherein the third pressure is greater than the second pressure.

According to another aspect of the present disclosure, a gas turbine engine is provided. The gas turbine engine includes at least one rotating shaft, at least one bearing compartment disposed to support the rotating shaft, and a lubrication system. The bearing compartment has at least one bearing and at least one fluid damped structure. The lubrication system includes a supply source of a fluid lubricant, a main supply pump, and a boost pump system. The main supply pump has at least one fluid flow inlet port ("MSP fluid flow inlet port") in fluid communication with the supply source of fluid lubricant, and at least one fluid flow exit port ("MSP fluid flow exit port") in fluid communication with the at least one bearing compartment. The main supply pump is configured to receive a source fluid lubricant flow from the supply source at a first pressure at the MSP fluid flow inlet port, and configured to produce a supply fluid flow at a second pressure at the MSP fluid flow exit port. The second pressure is greater than the first pressure. The boost pump system has a boost pump having at least one fluid flow inlet port ("BP fluid flow inlet port") in selective fluid communication with MSP fluid flow exit port, and at least one fluid flow exit port ("BP fluid flow exit port") in fluid communication with the at least one fluid damped structure of the at least one bearing compartment. The boost pump system is configured so that the boost pump selectively receives at least a portion of the supply fluid flow from the main supply pump at the BP fluid flow inlet port, and the boost pump is configured to produce a boost supply fluid flow at a third pressure at the BP fluid flow exit port, wherein the third pressure is greater than the second pressure.

In some embodiments, the boost pump may be driven by a mechanical power source, and the boost pump may be in an active state, wherein the boost pump continuously produces the boost supply fluid flow at the third pressure at the BP fluid flow exit port.

In some embodiments, the boost pump system may include a bypass valve, and may be configured to selectively direct at least a portion of boost supply fluid flow through the bypass valve and out of the boost pump system at a position upstream of the at least one of the plurality of engine components.

In some embodiments, the boost pump may be driven by an independent power source, and wherein the boost pump is selectively controllable to an active state where the boost pump continuously produces the boost supply fluid flow at the third pressure at the BP fluid flow exit port, or to an inactive state where the boost pump is not operating.

In some embodiments, the boost pump may be at least one of pneumatically, electrically, or hydraulically powered.

In some embodiments, the boost pump system may include a bypass circuit including a bypass valve, which bypass circuit is configured to selectively provide a fluid path for the supply fluid flow to bypass the boost pump when the boost pump is in the inactive state.

In some embodiments, the at least one fluid damped structure may be disposed within the bearing compartment and configured to permit radial movement of a bearing within the bearing compartment.

According to another aspect of the present disclosure, a method of supplying a fluid to at least one fluid damped structure disposed within a bearing compartment of a gas turbine engine is provided, wherein the gas turbine engine includes a rotating shaft and the bearing compartment is disposed to support the rotating shaft. The method may include: a) providing a main supply pump that has at least one fluid flow inlet port ("MSP fluid flow inlet port") and at least one fluid flow exit port ("MSP fluid flow exit port"); b) operating a main supply pump of the gas turbine engine to draw a fluid lubricant into the MSP fluid flow inlet port at a first pressure from a supply source, and to produce a supply fluid flow at a second pressure at the MSP fluid flow exit port, wherein the second pressure is greater than the first pressure; c) providing a boost pump system having a boost pump with at least one fluid flow inlet port ("BP fluid flow inlet port") in selective fluid communication with MSP fluid flow exit port, and at least one fluid flow exit port ("BP fluid flow exit port") in fluid communication with the at least one fluid damped structure; and d) operating the boost pump to produce a boost supply fluid flow at a third pressure at the BP fluid flow exit port, wherein the third pressure is greater than the second pressure, and to produce the boost supply fluid flow to the at least one fluid damped structure.

In various embodiments of the method, one or more of the various embodiments of the lubrication system described herein may be implemented. For example, the boost pump may be driven by a mechanical power source directly or indirectly in communication with the rotating shaft, and the boost pump is in an active state, wherein the boost pump continuously produces the boost supply fluid flow at the third pressure at the BP fluid flow exit port. As another example, the boost pump is driven by an independent power source, and the method may include selectively controlling the boost pump to an active state where the boost pump continuously produces the boost supply fluid flow at the third pressure at the BP fluid flow exit port, or to an inactive state where the boost pump is not operating. As yet another example, the method may include using a bypass circuit having a bypass valve to selectively provide a fluid path for the supply fluid flow to bypass the boost pump when the boost pump is in the inactive state.

The foregoing features and the operation of the present disclosure will become more apparent in light of the following description and the accompanying drawings.

DETAILED DESCRIPTION

Figure 1:
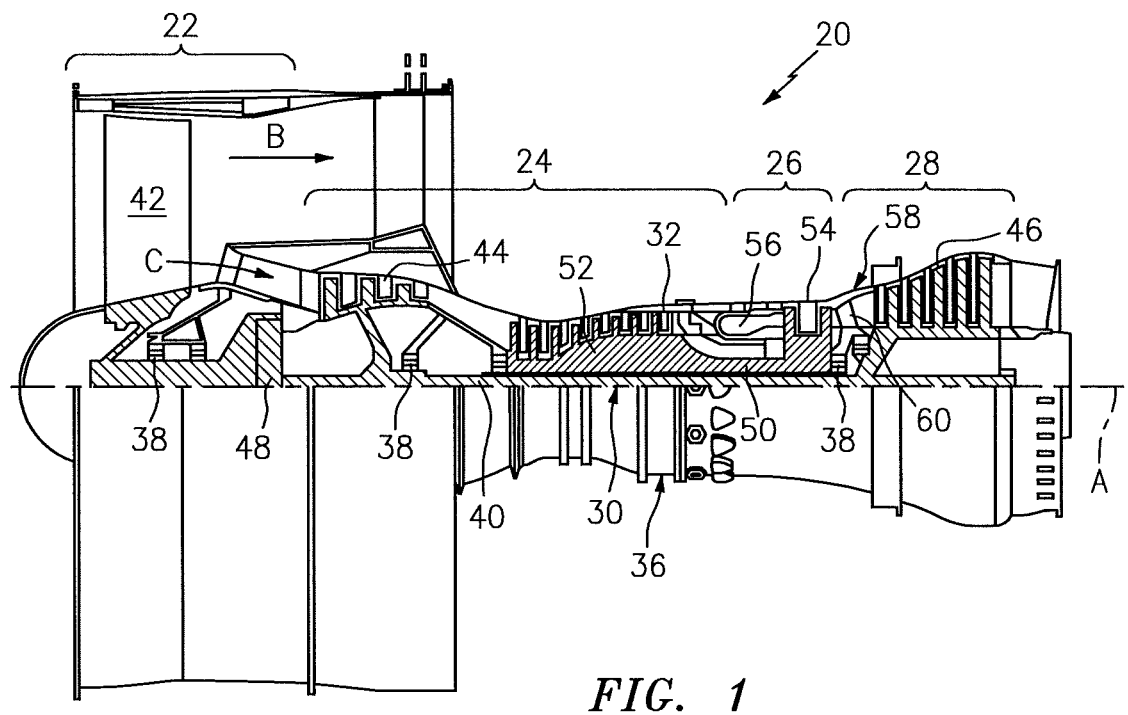
FIG. 1 is a diagrammatic partially sectioned view of a gas turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Referring now to the FIGURES, to facilitate the description of the present disclosure a two-spool turbofan type gas turbine engine 20 is shown (e.g., see FIG. 1). This exemplary embodiment of a gas turbine engine includes a fan section 22, a compressor section 24, a combustor section 26, a turbine section 28, a main lubrication system, and a boost pump system in fluid communication with one or more fluid damped structures. The fan section 22 drives air along a bypass flow path B in a bypass duct, while the compressor section 24 drives air along a core flow path C for compression and communication into the combustor section 26 then expansion through the turbine section 28. Although a two-spool turbofan gas turbine engine is described herein to facilitate the description of the present disclosure, it should be understood that the present disclosure is not limited to use with two-spool turbofans as the teachings may be applied to other types of turbine engines; e.g., three-spool architectures.

The exemplary engine 20 shown in FIG. 1 includes a low speed spool 30 and a high speed spool 32 mounted for rotation about an engine central longitudinal axis A relative to an engine static structure 36 via several bearing systems 38. It should be understood that the location, number, and characteristics of bearing systems 38 may vary to suit the particular application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. The inner shaft 40 and the outer shaft 50 are concentric and rotate via bearing systems 38 about the engine central longitudinal axis "A" which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The gas turbine engine 20 diagrammatically depicted in FIG. 1 is one example of a high-bypass geared aircraft engine. In other examples, the gas turbine engine 20 may have a bypass ratio that is greater than about six (6), with an example embodiment being greater than about ten (10), the geared architecture 48 may be an epicyclic gear train, such as a planetary gear system or other gear system, with a gear reduction ratio of greater than about 2.3 and the low pressure turbine 46 may have a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. The low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one or more embodiments of a geared architecture engine and that the present disclosure is applicable to other gas turbine engines including direct drive turbofans.

Figure 2:
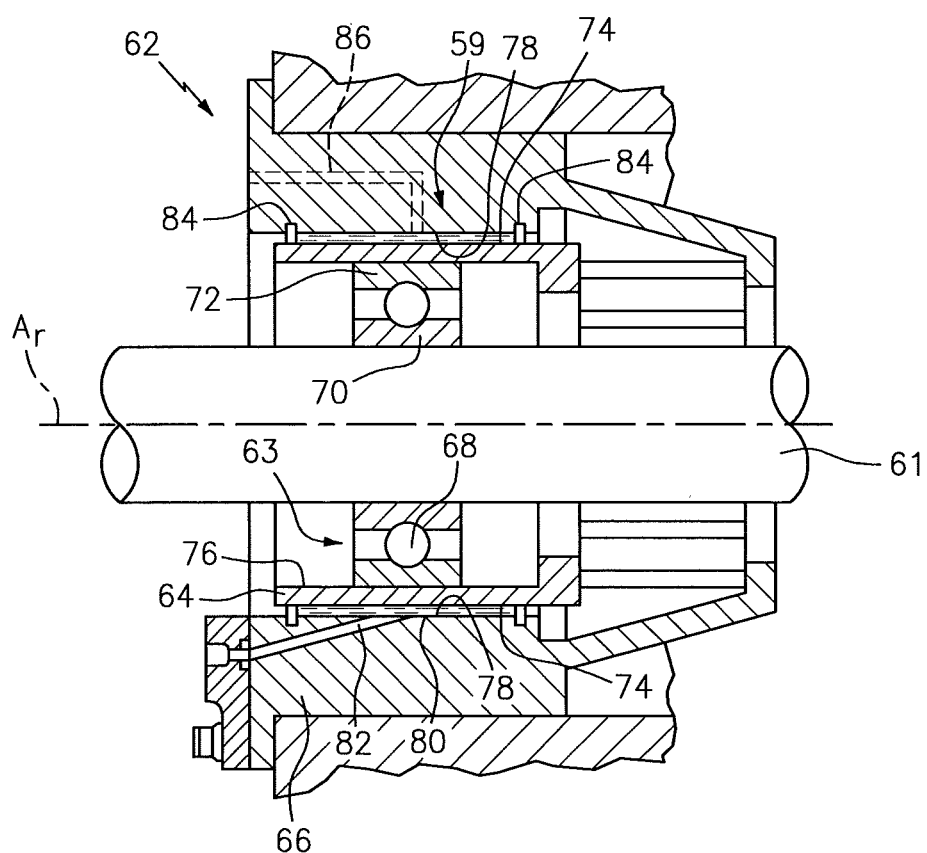
FIG. 2 is a diagrammatic cross-sectional view of a portion of a gas turbine engine showing a bearing compartment with a bearing and a fluid damped structure.

The present disclosure may be utilized to provide a damping fluid (e.g., a lubricating oil used within the engine) to a fluid damped structure in communication with a bearing for a rotating shaft. The present disclosure is not limited to use with any particular type of fluid damped structure. To facilitate the description of the present disclosure, however, a non-limiting example of a fluid damped structure is shown in FIG. 2. FIG. 2 is a simplified diagrammatic cross-sectional view of a portion of a gas turbine engine showing a typical support structure 62 for a rotor shaft 61; e.g., a shaft section of a high speed spool. The support structure 62 includes, a bearing 63 and its bearing housing 64, and an adjacent stator structure 66.

The rotor shaft 61 is rotatable about an axis of rotation $A_r$ within a range of rotational velocities. The bearing 63 is represented in this particular embodiment as one having rolling elements such as balls 68 disposed between an inner race 70 and an outer race 72. The inner race 70 engages the rotor shaft 61. The bearing housing 64 is nonrotating and has an outer surface 74 and an inner surface 76. The bearing housing 64 supports the rotating components of the bearing 63 such as the inner race 70 and the balls 68 of the bearing 63. In the particular construction shown, the outer race 72 engages the balls 68 and is engaged by the inner surface 76 of the bearing housing 64.

The adjacent stator structure 66 of the support structure 62 includes a cylindrical surface 78 facing inwardly which is spaced radially from the outwardly facing cylindrical surface 74 of the bearing housing 64 thereby defining a portion of an annular damping chamber 80. The stator structure 66 includes structure configured to supply damping oil to the damping chamber 80; e.g., one or more inlet conduits 82.

A pair of ring seals 84 are disposed between the bearing housing 64 and the stator structure 66. The ring seals 84 are spaced axially apart and extend circumferentially about the axis of the engine. Each ring seal 84 extends radially between and engages the bearing housing 64 and the stator structure 66 to define a portion of the damping chamber 80. The ring seals 84 may not be absolutely fluid tight and may include features configured to vent the damping chamber 80; e.g., passages (not shown) extending through the ring seals 84 that provide a fluid flow path between the damping chamber 80 and the exterior of the damping chamber 80. Alternatively, seal members might extend between the stator structure 66 and the inner housing 64 to make the damping chamber 80 relatively fluid tight. In such constructions, the damping chamber 80 may be vented by one or more outlet conduits; e.g., outlet conduit 86 shown by the dotted lines. Of course, other structure for venting the damping chamber 80 might be used. The various components described above configured to form the damping chamber 80 (e.g., the ring seals 84, the void formed between the bearing housing outer surface 74 and the support structure inner surface 78, the damping chamber feed conduit 82, etc.) may be described as a fluid damped structure 59. As indicated above and repeated here for sake of clarity, the fluid damped structure 59 shown in FIG. 2 is a non-limiting diagrammatic representation of a fluid damping structure, and the present disclosure is not limited thereto. In some embodiments, the present disclosure may be used with a plurality of different types/configurations of fluid damping structures within a gas turbine engine 20.

Figure 3:
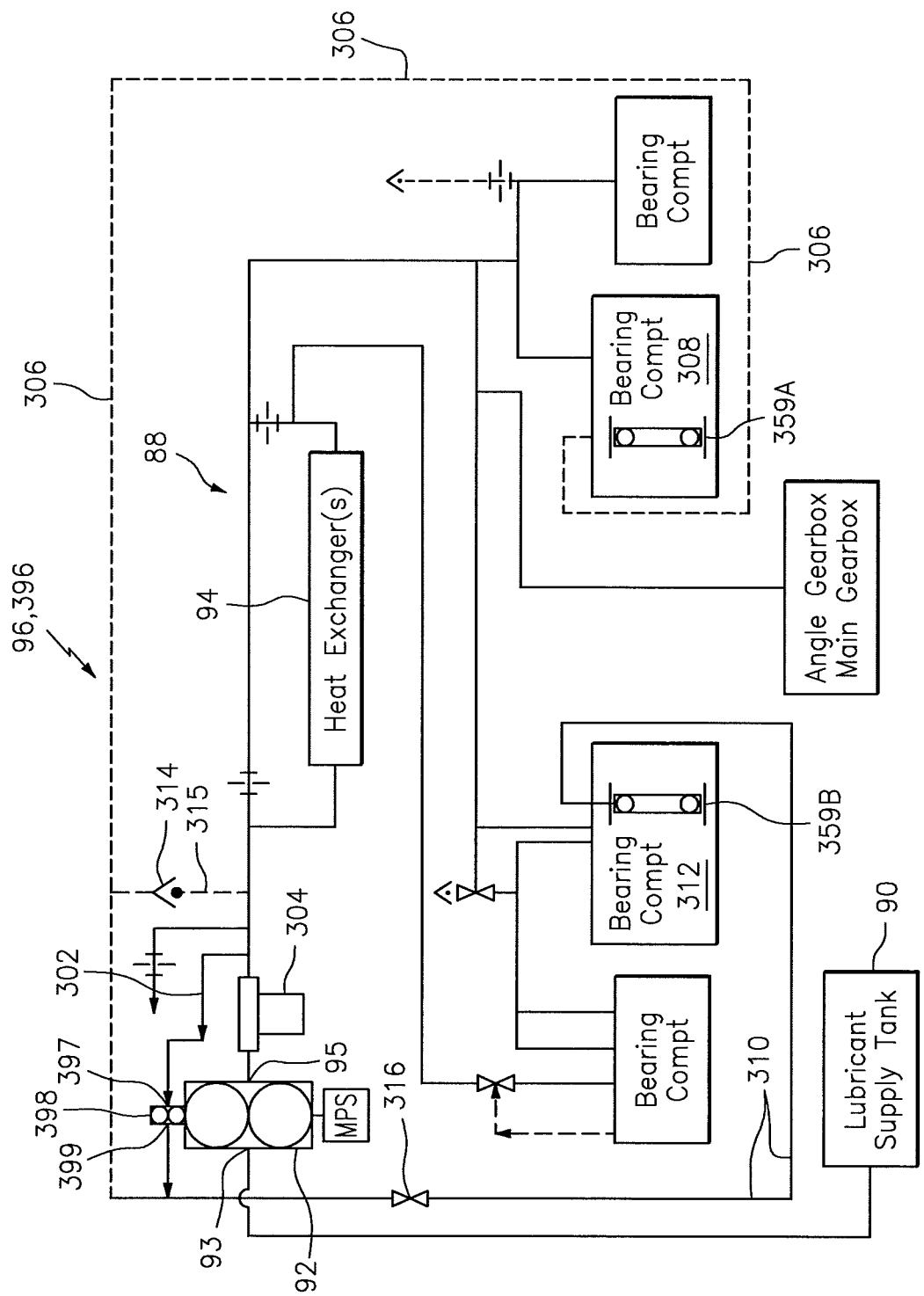
FIG. 3 is a schematic diagram of a lubrication system and boost pump system embodiment.

The main lubrication system is configured to cycle a lubricant to and from one or more engine components (e.g., bearings, etc.), which lubricant is used to lubricate and/or cool various parts of the gas turbine engine 20. Referring to FIG. 3, the main lubrication system 88 may include a lubricant storage tank 90 for storing a quantity of lubricant and may include a main supply pump 92 for drawing a supply of lubricant from the lubricant storage tank 90 and passing that lubricant to the one or more engine components. The main supply pump 92 includes at least one fluid inlet port 93 and at least one fluid outlet port 95. The main lubrication system 88 as may be used with the present disclosure is not limited to including any particular type of main supply pump 92. In most embodiments, the main supply pump 92 is a positive displacement pump configured to produce lubricant output at parameters that vary as a function of the rotational speed of an engine spool. For example, in many gas turbine engines 20 the main supply pump 92 is mechanically driven off of the high speed spool that connects the high pressure compressor section and the high pressure turbine section.

In some embodiments, the main lubrication system may include one or more heat exchangers 94 (e.g., a two-fluid heat exchanger such as an air/oil, or a fuel/oil, or an oil/oil type heat exchanger wherein a lubricating fluid is respectively cooled by air, fuel, or lubricant at a lower temperature). The main lubrication system 88 may include a plurality of components for controlling lubricant flow parameters (e.g., pressure, flow rate, etc.); e.g., one or more valves and one or more fluid metering devices disposed at various locations within the main lubrication system 88 to permit fluidic control of lubricant passing through the main lubrication system 88. The one or more valves may include valves configured to permit or prevent fluid flow (e.g., "shut off valves"), one or more valves configured to regulate flow (e.g., shuttle valves, reduction valves, bypass valves, etc.). The one or more fluid metering valves may include metering orifices (e.g., to control a fluid flow rate). The present disclosure is not limited to any particular type or configuration main lubrication system 88, and therefore is not limited to the use of particular components for controlling flow parameters within the main lubrication system 88.

Non-limiting diagrammatic examples of main lubrication systems 88, including components for controlling flow parameters incorporated therein, are provided below. Components within the main lubrication system 88 are fluidically connected within the main lubrication system 88 by conduits configured to contain lubricant fluid flow. The term "conduit" as used herein refers to any enclosed structure (e.g., piping) through which a fluid may be passed.

A variety of different gas turbine engine lubricants are known in the public and will not therefore be discussed further herein. The present disclosure is not limited to use with any particular gas turbine engine lubricant. Typical lubricants used within a gas turbine engine have a viscosity in the range of about 25 to 1.5 centistokes within the typical engine operating temperature range.

The boost pump system 96 includes a boost pump having at least one fluid flow inlet port and at least one fluid flow outlet port. The boost pump is configured to receive a lubricant fluid flow through the fluid flow inlet port and produce an exit fluid flow out of the fluid flow exit port. The fluid flow entering the fluid flow inlet port may be described as having an inlet fluid pressure "$P_{inlet}$" and the fluid flow exiting the fluid flow exit port may be described as having an exit pressure "$P_{exit}$". The exit fluid pressure is greater than the inlet fluid pressure (i.e., $P_{exit} > P_{inlet}$). A non-limiting example of an acceptable boost pump is a pump configured to at least double the fluid pressure of a lubricant flow through the boost pump.

In some embodiments, the boost pump may be driven by a mechanical power source ("MPS") that is driven directly or indirectly by an engine spool shaft; e.g., by a driveshaft of an accessory gearbox that is driven directly or indirectly from an engine spool shaft. In such an arrangement, both the boost pump and the main supply pump 92 may be driven by the same accessory gearbox driveshaft. The boost pump and the main supply pump 92 may be driven be driven at different rotational speeds; e.g., the accessory gearbox, or other gearing may provide driveshafts that operate at different rotational speeds. Embodiments of the present disclosure that utilize a mechanically powered boost pump are not limited to any particular drive configuration. In addition, the present disclosure is not limited to a particular type of mechanically powered boost pump. Non-limiting examples of acceptable mechanically powered boost pumps include positive displacement type pumps, and centrifugal type pumps, and the like.

In some embodiments, the boost pump may be powered independently from an engine spool shaft (e.g., no mechanical shaft or gear connection) and may be pneumatically, electrically, or hydraulically powered.

The boost pump system 96 may include one or more components configured to permit or prevent fluid flow (e.g., "shut off valves") to the boost pump and/or to engine components in selective fluid communication with the boost pump, one or more components configured to regulate flow (e.g., bypass valves, metering orifices, etc.).

In some embodiments (e.g., see FIGS. 3-8), the boost pump system 96 is configured such that the fluid flow to the fluid flow inlet port of the boost pump is provided from the main lubrication system 88 "downstream" of the fluid outlet port 95 of the main supply pump 92, but "upstream" of a lubrication recovery system that collects lubricant fluid that has passed through components such as bearings and gearboxes, etc.; i.e., the fluid flow that enters the boost pump is at a pressure and flow rate established by the main supply pump 92, subject to any losses attributable to piping and/or components (e.g., filters) disposed there between. Typically, but not necessarily, the fluid flow from the main lubrication system 88 to the boost pump would be accessed from a conduit in fluid communication with the fluid flow outlet port 95 of the main supply pump 92, and in relative close proximity to the fluid flow outlet port 95 of main supply pump 92.

In other embodiments (e.g., see FIG. 9), the boost pump system is configured such that the fluid flow to the fluid flow inlet of the boost pump is accessed "upstream" of the fluid inlet port 93 of the main supply pump 92; e.g., at a point between the main supply pump 92 and the lubricant storage tank 90. In these embodiments, therefore, the fluid flow that enters the boost pump is not at the fluid pressure exiting the fluid flow outlet port 95 of the main supply pump 92.

Diagrammatic non-limiting examples of boost pump systems are shown in FIGS. 3-9 to illustrate the utility of the present disclosure. In FIG. 3, for example, the boost pump system 396 includes a boost pump 398 having at least one fluid inlet port 397 and at least one fluid exit port 399. The boost pump 398 is powered by a mechanical power source (an "MPS" such as an accessory gearbox driven directly or indirectly off an engine spool shaft) and may be configured to continuously operate; e.g., in an active state with the main supply pump 92. First conduits 302 are configured to tap lubricant from the main lubrication system 88 downstream of a filter 304 disposed in relative close proximity to the fluid flow exit port 95 of the main supply pump 92. The boost pump system 396 further includes second conduits 306 that supply lubricant to a fluid damped structure 359A utilized within a first bearing compartment 308, and third conduits 310 that supply lubricant to fluid damped structure 359B utilized within a second bearing compartment 312. As can be seen in FIG. 3, the boost pump system 396 may include a bypass valve 314 disposed in a conduit 315 extending between the boost pump system 396 and a main lubrication system 88. The bypass valve 314 may be configured to open when lubricant within the boost pump system conduit 315 is at or above a predetermined pressure value; e.g., to allow some amount of the lubricant flow passing within the bypass conduit 315 back to the main lubrication system 88 and thereby control lubricant pressure within the boost pump system 396. The diagrammatic system shown in FIG. 3 depicts the bypass valve 314 and conduit 315 is a non-limiting diagrammatic example of how the bypass valve 314 may be disposed, and the present disclosure is not limited to this particular example. As indicated above, the boost pump system 396 may also include one or more fluid control components; e.g., metering components, shut-off valves, etc. For example, the diagrammatic boost pump system 396 shown in FIG. 3 depicts a shut-off type valve 316 disposed within one of the third conduits 310. The present disclosure is not, however, limited to this particular embodiment. As indicated above, the present disclosure is not limited to use with any particular type of fluid damped structure.

Figure 4:
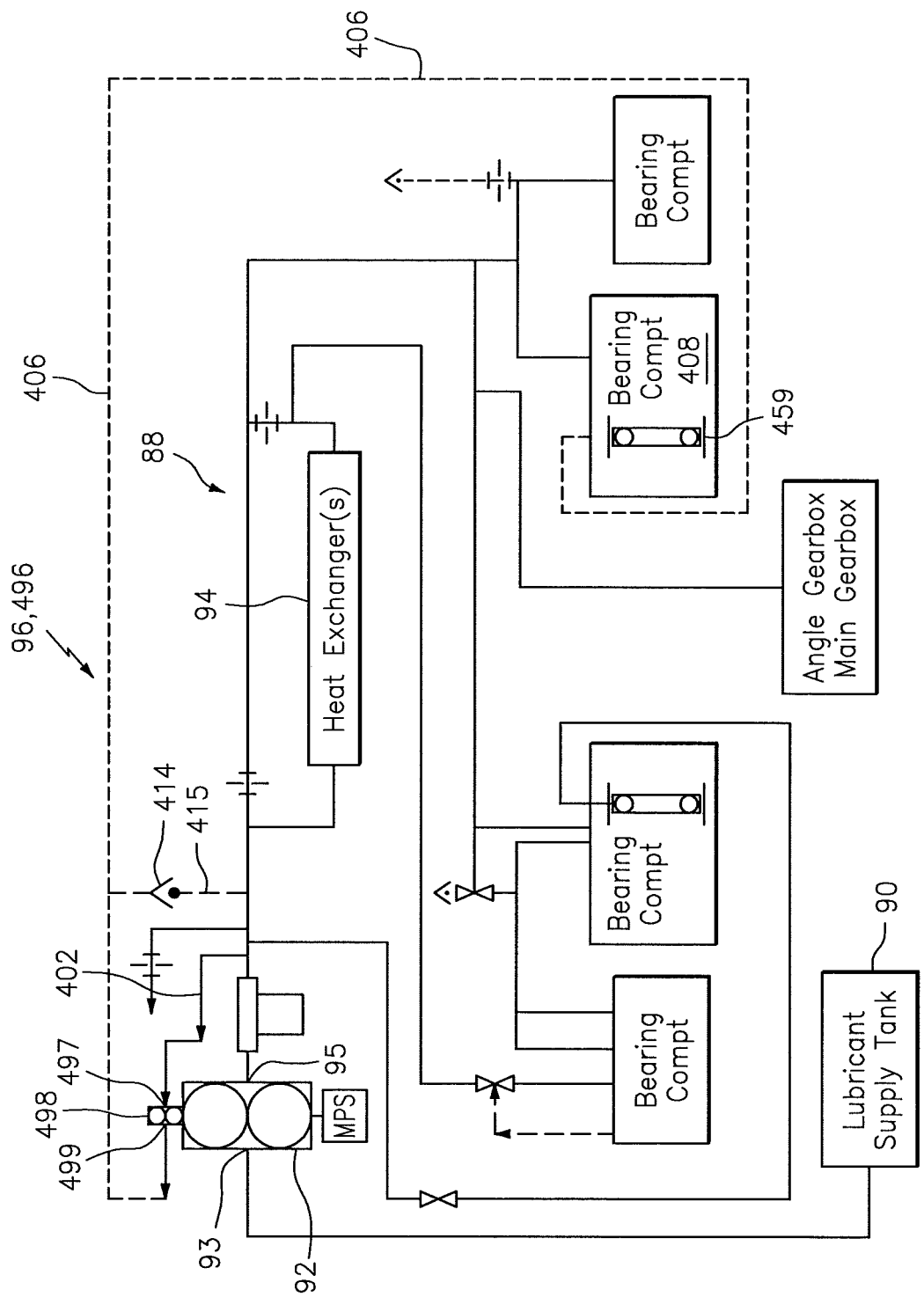
FIG. 4 is a schematic diagram of a lubrication system and boost pump system embodiment.

Another boost pump system embodiment is shown in FIG. 4. In this embodiment, the boost pump system 496 includes a boost pump 498 having at least one fluid inlet port 497 and at least one fluid exit port 499. The boost pump 498 is powered by a mechanical power source (e.g., an MPS such as an accessory gearbox and may be configured in an active state), and first conduits 402 are configured to tap lubricant from the main lubrication system 88 (e.g., as described above in the embodiment shown in FIG. 3). The boost pump system 496 further includes second conduits 406 that supply lubricant to fluid damped structure 459 utilized within a first bearing compartment 408. As can be seen in FIG. 4, the boost pump system 496 may include a bypass valve 414 disposed in a conduit 415 extending between the boost pump system conduit and the main lubrication system 88 (e.g., as described above in the embodiment shown in FIG. 3). Although not shown in FIG. 4, the boost pump system 496 may also include one or more fluid control components (e.g., a shut-off valve as shown in FIG. 3).

Figure 5:
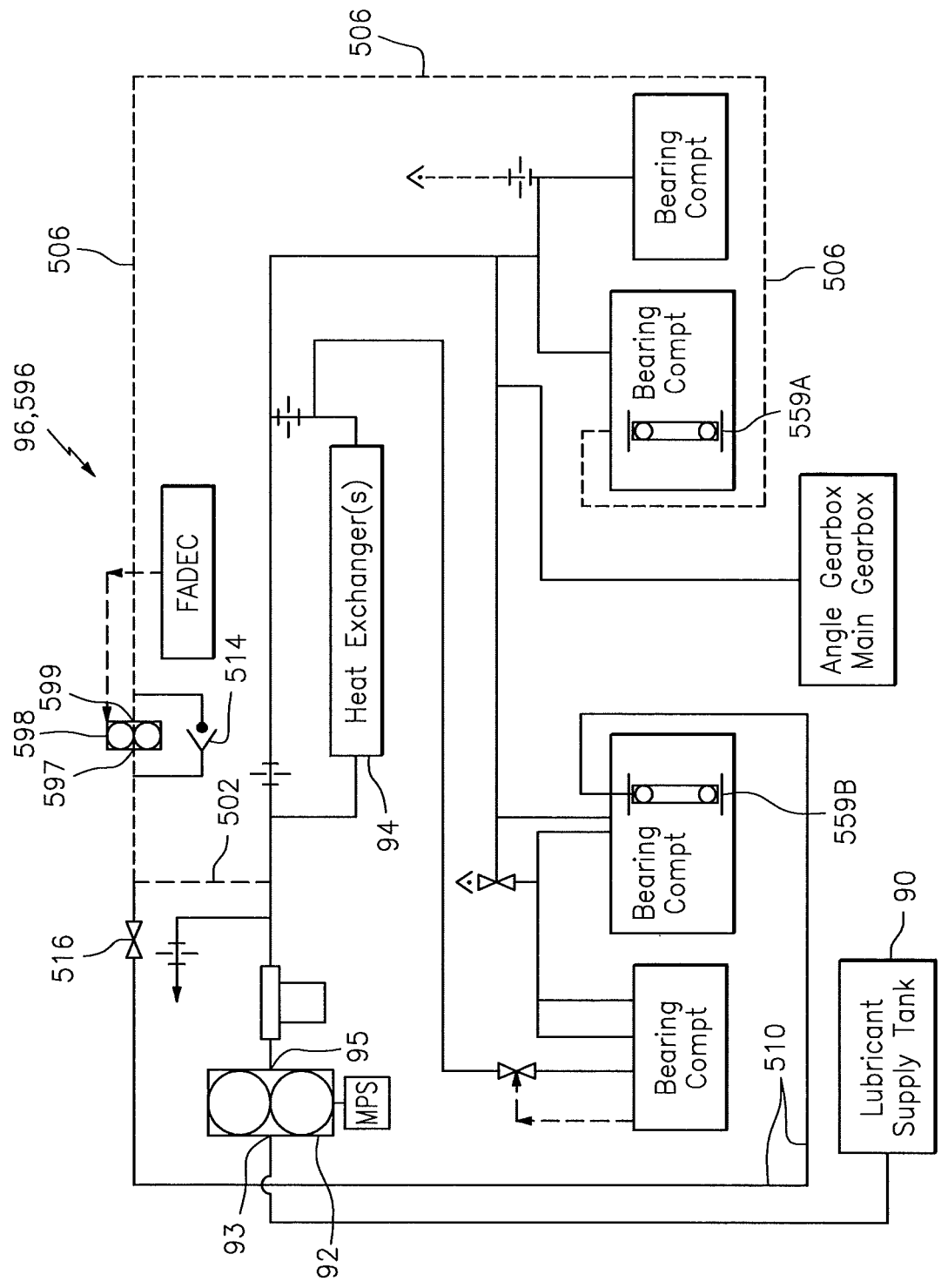
FIG. 5 is a schematic diagram of a lubrication system and boost pump system embodiment.
Figure 6:
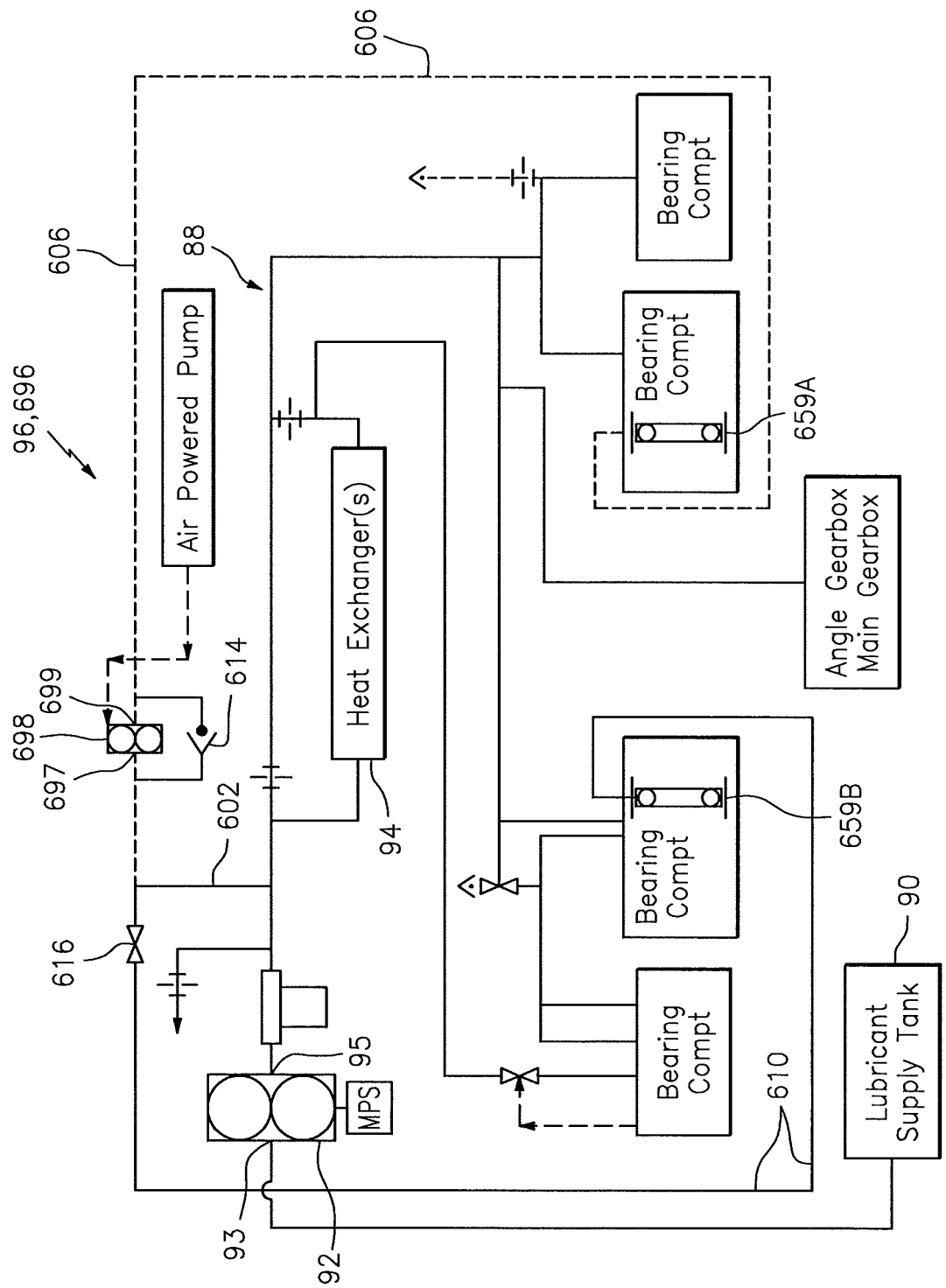
FIG. 6 is a schematic diagram of a lubrication system and boost pump system embodiment.

Additional boost pump system embodiments are shown in FIGS. 5 and 6. In the embodiment shown in FIG. 5, the boost pump system 596 includes a boost pump 598 having at least one fluid inlet port 597 and at least one fluid exit port 599. The boost pump 598 is electrically powered and controlled by the Full Authority Digital Control ("FADEC") system of the gas turbine engine 20 (or other type controller). In the embodiment shown in FIG. 6, the boost pump system 696 includes a boost pump 698 having at least one fluid inlet port 697 and at least one fluid exit port 699. The boost pump 698 is pneumatically powered (and may be controlled by a FADEC or other controller). The present disclosure is not limited to any particular pneumatic source for powering the boost pump 698; e.g., such sources may include starter air bleed from an aircraft powered by the engine, engine bleed air, etc. In both of these embodiments, the boost pump 598, 698 may be selectively controllable (e.g., by the FADEC or other controller) to an active state where the boost pump 598, 698 continuously operates, or in an inactive state where the boost pump 598, 698 is not operating. Also in both these embodiments, first conduits 502, 602 are configured to tap lubricant from the main lubrication system 88 (e.g., as described above in the embodiment shown in FIG. 3) and pass that lubricant to the fluid flow inlet port 597, 697 of the boost pump 598, 698. The boost pump 598, 698 is disposed in communication with the second conduits 506, 606 and third conduits 510, 610 to provide lubricant to the respective fluid damped structures 559A, 559B, 659A, 659B. In addition, as can be seen in FIGS. 5 and 6, the boost pump system 596, 696 may include a bypass valve 514, 614 disposed in a conduit extending around the boost pump 598, 698. In the boost pump embodiments shown in FIGS. 5 and 6, the bypass valve 514, 614 is configured to selectively allow a bypass lubricant flow around the boost pump 598, 698 (e.g., when the boost pump 598, 698 is in an inactive state). As shown in FIGS. 5 and 6, the boost pump system 596, 696 may also include one or more fluid control components (e.g., a shut-off valve 516, 616).

Figure 7:
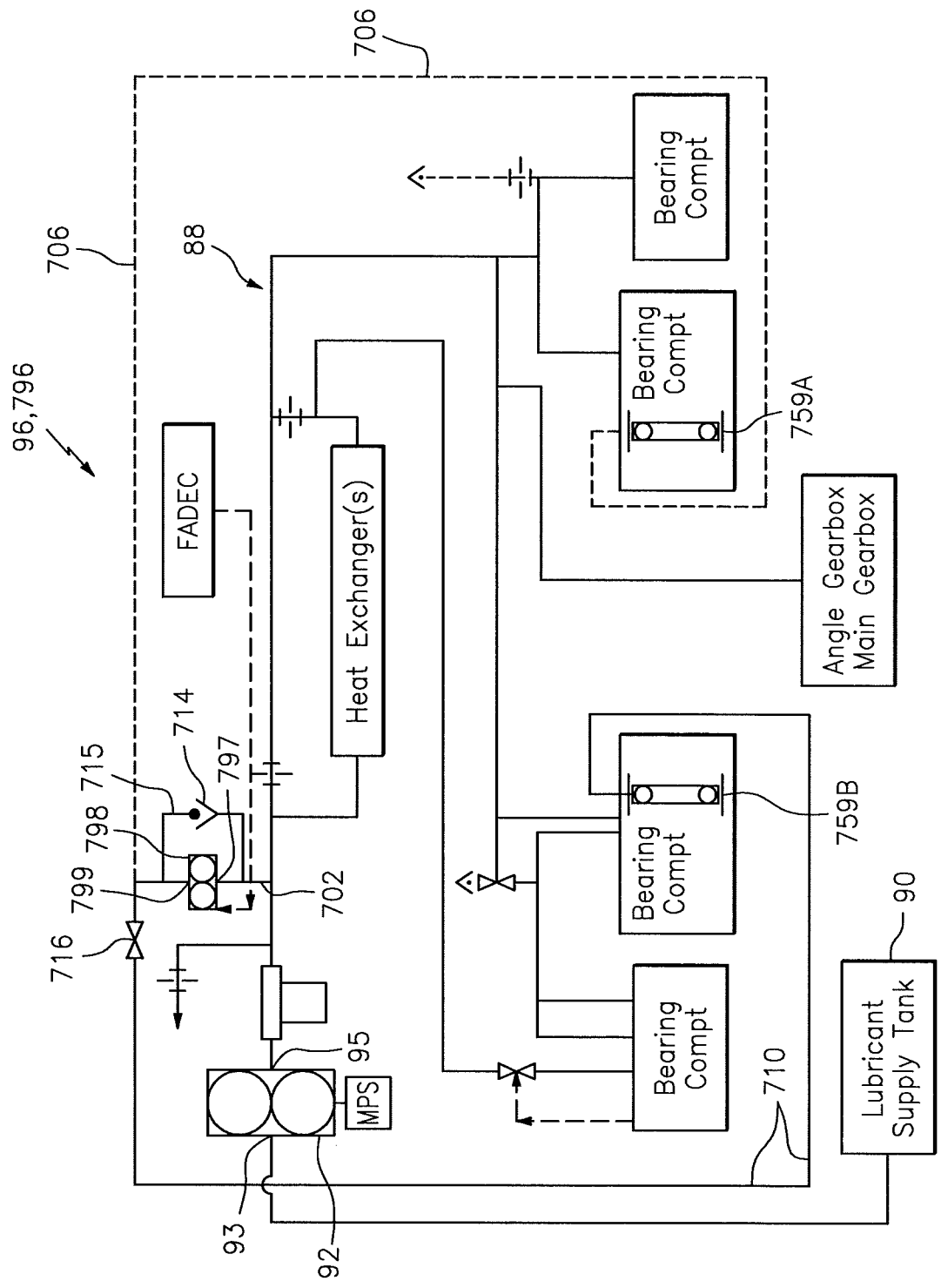
FIG. 7 is a schematic diagram of a lubrication system and boost pump system embodiment.
Figure 8:
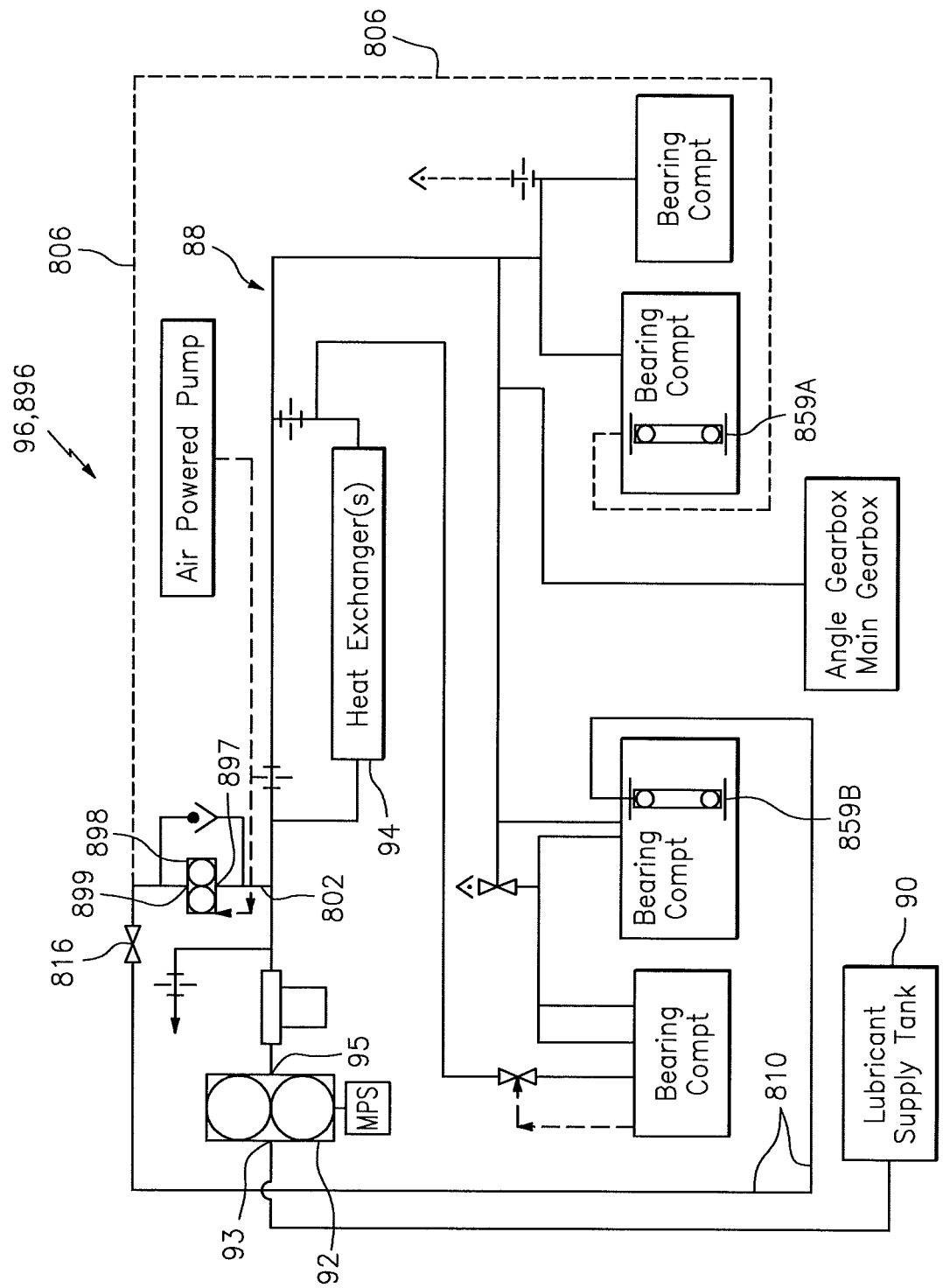
FIG. 8 is a schematic diagram of a lubrication system and boost pump system embodiment.

Additional boost pump system embodiments are shown in FIGS. 7 and 8. In the embodiment shown in FIG. 7, the boost pump system 796 includes a boost pump 798 having at least one fluid inlet port 797 and at least one fluid exit port 799. The boost pump 798 is electrically powered and controlled by the Full Authority Digital Control ("FADEC") system of the gas turbine engine (or other controller). In the embodiment shown in FIG. 8, the boost pump system 896 includes a boost pump 898 having at least one fluid inlet port 897 and at least one fluid exit port 899. The boost pump 898 is pneumatically powered (and may be controlled by a FADEC or other controller). As indicated above, the present disclosure is not limited to any particular pneumatic source for powering the boost pump 698; e.g., such sources may include starter air bleed from an aircraft powered by the engine, engine bleed air, etc. In both of these embodiments, the boost pump 798, 898 may be selectively controllable (e.g., by the FADEC or other controller) to an active state where the boost pump 798, 898 continuously operates, or in an inactive state where the boost pump 798, 898 is not operating. Also in these embodiments, a first conduit 702, 802 is configured to tap lubricant from the main lubrication system 88 (e.g., as described above in the embodiment shown in FIG. 3) and pass that lubricant to the fluid flow inlet 797, 897 of the boost pump 798, 898. The boost pump 798, 898 is disposed in communication with the second conduits 706, 806 and third conduits 710, 810 to provide lubricant to the respective fluid damper structures 759A, 759B, 859A, 859B. As can be seen in FIGS. 7 and 8, the boost pump system 796, 896 may include a bypass valve 714, 814 disposed in a conduit 715, 815 extending around the boost pump 798, 898 e.g., a bypass valve 714, 814 configured to selectively allow a bypass lubricant flow around the boost pump 798, 898 (e.g., when the boost pump 798, 898 is in an inactive state). The boost pump system 796, 896 may also include one or more fluid control components (e.g., a shut-off valve 716, 816 as shown in FIGS. 7 and 8).

Figure 9:
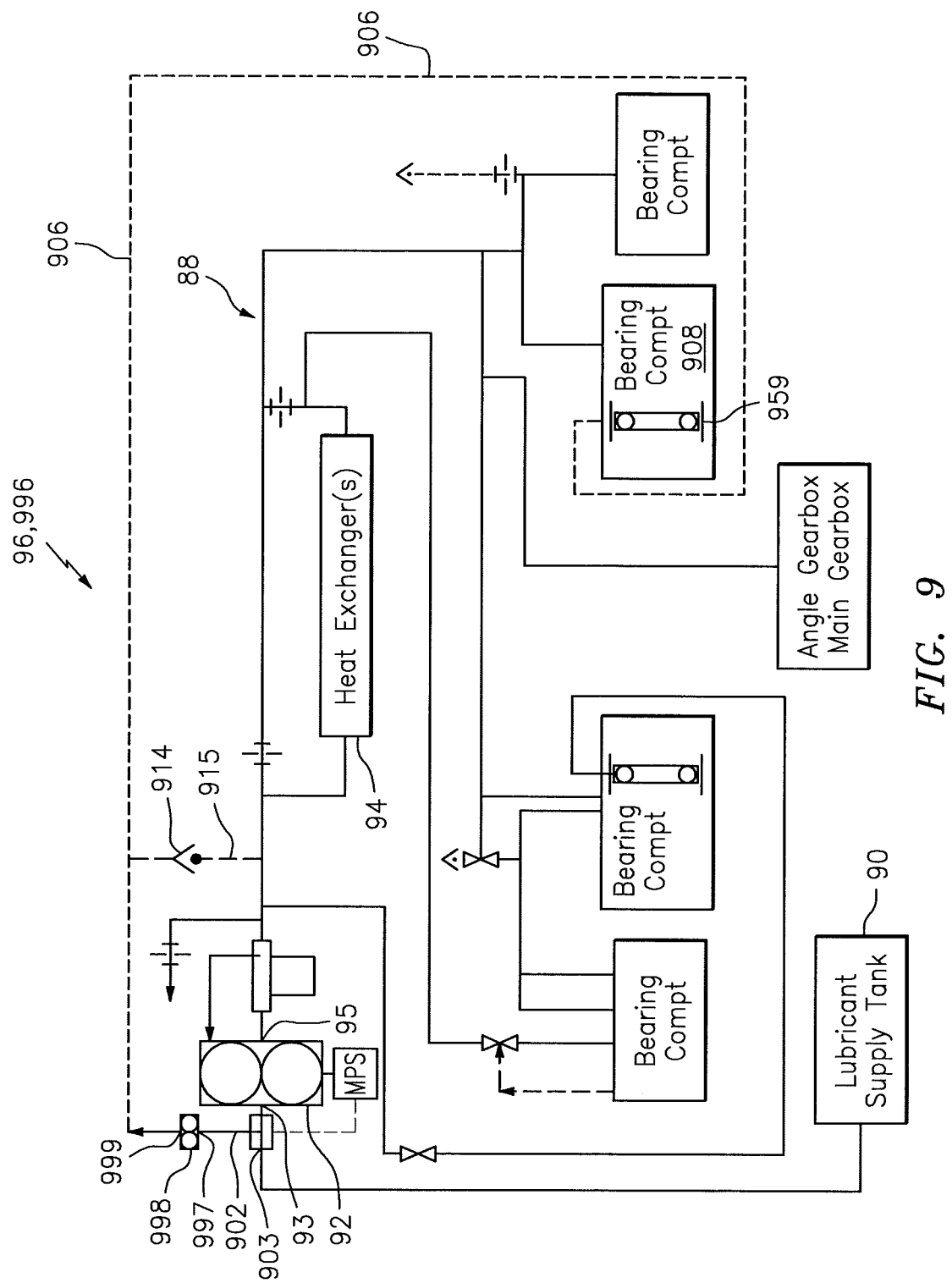
FIG. 9 is a schematic diagram of a lubrication system and boost pump system embodiment.

An additional boost pump system embodiment is shown in FIG. 9. In this embodiment, the boost pump system 996 includes a boost pump 998 having at least one fluid inlet port 997 and at least one fluid exit port 999. The boost pump 998 may be driven by a mechanical power source ("MPS") as described above, or may be independently powered (e.g., electrically, pneumatically, or hydraulically powered). A first conduit 902 is configured to tap lubricant from the main lubrication system 88 upstream of the main supply pump 92; e.g., at a point between the main supply pump 92 and the lubricant supply tank 90. At this tap position upstream of the main supply pump 92, the fluid flow that enters the boost pump 998 is not at the fluid pressure exiting the fluid flow outlet 95 of the main supply pump 92. The boost pump system 996 may include a filtering device 903 (e.g., a wash-flow screen) upstream of the boost pump 998 to catch debris or other contaminants within the fluid flow. The present disclosure is not limited to this particular filtering device, or a filtering device located in this particular location; e.g., a filtering device may be placed on a main lubricant system return line, etc. In this embodiment, the fluid flow exit port 999 of the boost pump 998 is in fluid communication with second conduits 906 that supply lubricant to fluid damped structure 959 utilized within a bearing compartment 908. As can be seen in FIG. 9, the boost pump system 996 may include a bypass valve 914 disposed in a conduit 915 extending between a second conduit section and the main lubrication system 88 (e.g., as described above in the embodiment shown in FIG. 3). Although not shown in FIG. 9, the boost pump system 996 may also include one or more fluid control components (e.g., a shut-off valve as shown in FIG. 3).

In the above described embodiments, fluid provided to the fluid damped structure(s) by the boost pump system passes through the fluid damped structure(s) and is collected via a lubricant scavenge system and returned to the main lubrication system 88. The boost pump system may be configured as to be the sole source of lubricant to the fluid damped structure(s). Alternatively, lubricant from the boost pump system may be selectively combined with lubricant provided to the fluid damped structures from the main lubrication system 88; i.e., the boost pump system acts as an auxiliary source of pressurized lubricant to the fluid damped structures.

In many gas turbine engines the main supply pump 92 is configured to produce lubricant output at parameters that vary as a function of the rotational speed of a rotational component driving the main supply pump 92. For example, in many gas turbine engines the main supply pump 92 is mechanically driven off of the high speed spool that connects the high pressure compressor section and the high pressure turbine section. Because the main supply pump 92 is operatively linked to the high speed spool in these embodiments, the output parameters of the main supply pump 92 (e.g., lubricant fluid pressure and flow rate) vary as a function of the rotational speed of the high speed spool.

Under certain gas turbine engine operating conditions (e.g., when the engine is operating in a cruise mode powering an aircraft), the high speed spool is typically rotating in the range of 13,000 to 23,000 revolutions per minute ("rpms"). Hence, a main supply pump sized to meet the engine's lubrication requirements in that operational range could theoretically meet the lubrication flow requirements of the engine. However, as indicated above, gas turbine engines also operate outside of the aforesaid operational range (13,000 to 23,000 rpms) under certain conditions (e.g., start-up, idle, etc.). The main supply pump must, therefore, be sized to satisfy the lubrication flow requirements under all anticipated engine operating conditions, or alternative means must be provided to satisfy the engine's lubrication flow requirements. Embodiments of the present disclosure leverage the work done by the main supply pump, using a boost pump to selectively provide a lubricant fluid flow at a pressure higher than that produced by the main supply pump to components (e.g., fluid damped structures) as necessary to meet the requirements of the aforesaid components.

For example in the embodiments diagrammatically shown in FIGS. 3-8, the boost pump system includes a boost pump that draws lubrication oil from the main lubrication system 88 at an elevated pressure downstream of the main supply pump 92. As the lubrication oil passes through the boost pump, the pressure of the lubrication oil is increased from $P_{inlet}$ to $P_{exit}$ (i.e., $P_{exit} > P_{inlet}$). Under certain engine operating conditions, the increased pressure lubrication oil is subsequently passed to engine components (e.g., fluid damped structures disposed within bearing compartments). Under engine operating conditions wherein the increased pressure lubrication oil from the boost pump is not required, the operation of the boost pump may be terminated or the lubrication oil flow from the boost pump may be directed back to the main lubrication system and/or an oil scavenge system of the engine. In some of the aforesaid embodiments, some or all of the lubrication oil flow exiting the boost pump may be redirected by a bypass valve.

The present disclosure also includes a method of supplying a fluid to at least one fluid damped structure disposed within a bearing compartment of a gas turbine engine using the structure described above. For example, the method may include operating the main supply pump 92 of the gas turbine engine 20 to draw fluid lubricant into the MSP fluid flow inlet port 93 at a first pressure from a supply source 90, and to produce a supply fluid flow at a second pressure at the MSP fluid flow exit port 95, wherein the second pressure is greater than the first pressure, and operating the boost pump 398, 498, 598, 698, 798, 898, 998 to produce a boost supply fluid flow at a third pressure at the BP fluid flow exit port 399, 499, 599, 699, 799, 899, 999, wherein the third pressure is greater than the second pressure, and to produce the boost supply fluid flow to the at least one fluid damped structure 359A, 359B, 459, 559A, 559B, 659A, 659B, 759A, 759B, 859A, 859B, 959. The method may also include driving the boost pump with a mechanical power source, wherein the boost pump is in an active state, and continuously producing boost supply fluid flow at the third pressure at the BP fluid flow exit port. The method may include driving the boost pump with an independent power source, and selectively controlling the boost pump to an active state where the boost pump continuously produces the boost supply fluid flow at the third pressure at the BP fluid flow exit port, or to an inactive state where the boost pump is not operating. In these embodiments, the method may include using a bypass circuit with a bypass valve to selectively provide a fluid path for the supply fluid flow to bypass the boost pump when the boost pump is in the inactive state.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A lubrication system for a gas turbine engine having a plurality of components,
   the lubrication system comprising:
   a supply source of a fluid lubricant;
   a main supply pump including a first fluid flow inlet port and a first fluid flow exit port, the first fluid flow inlet port in fluid communication with the supply source, and the first fluid flow exit port in fluid communication with the plurality of engine components;
   the main supply pump configured to receive a source fluid lubricant flow from the supply source at a first pressure at the first fluid flow inlet port, and the main supply pump configured to produce a supply fluid flow at a second pressure at the first fluid flow exit port, wherein the second pressure is greater than the first pressure; and
   a boost pump system including a boost pump, the boost pump including a second fluid flow inlet port and a second fluid flow exit port, the second fluid flow inlet port in fluid communication with the supply source, and the second fluid flow exit port in selective fluid communication with at least one of the plurality of engine components;
   the boost pump system configured to produce a boost supply fluid flow at a third pressure at the second fluid flow exit port, wherein the third pressure is greater than the second pressure, and the lubrication system configured to provide the boost supply fluid flow to at least one said component independently of the supply fluid flow.

2. The lubrication system of claim 1, wherein the boost pump is driven by a mechanical power source.

3. The lubrication system of claim 2, wherein, when the boost pump is in an active state, the boost pump is configured to continuously produce the boost supply fluid flow at the third pressure at the second fluid flow exit port.

4. The lubrication system of claim 3, wherein the boost pump system includes a bypass valve; and
   the boost pump system is configured to selectively direct at least a portion of boost supply fluid flow through the bypass valve and out of the boost pump system at a position upstream of the at least one of the plurality of engine components.

5. The lubrication system of claim 1, wherein the boost pump is driven by an independent power source, the boost pump is selectively controllable to an active state or an inactive state;

the boost pump is configured to continuously produce the boost supply fluid flow at the third pressure at the second fluid flow exit port in the active state; and the boost pump is non-operational in the inactive state.

6. The lubrication system of claim 5, wherein the boost pump is at least one of pneumatically, electrically, or hydraulically powered.

7. A gas turbine engine, comprising:

a shaft;

a bearing compartment configured to support the shaft, the bearing compartment including a bearing and a fluid damped structure; and a lubrication system comprising:

a supply source of a fluid lubricant;

a main supply pump including a first fluid flow inlet port and a first fluid flow exit port, the first fluid flow inlet port in fluid communication with the supply source, and the fluid flow exit port in fluid communication with the bearing compartment;

the main supply pump configured to receive a source fluid lubricant flow from the supply source at a first pressure at the first fluid flow inlet port, and the main supply pump configured to produce a supply fluid flow at a second pressure at the first fluid flow exit port, wherein the second pressure is greater than the first pressure; and a boost pump system comprising a boost pump, the boost pump including a second fluid flow inlet port and a second fluid flow exit port, the second fluid flow inlet port in fluid communication with the supply source, and the second fluid flow exit port in fluid communication with the fluid damped structure of the bearing compartment;

the boost pump configured to produce a boost supply fluid flow at a third pressure at the second fluid flow exit port, wherein the third pressure is greater than the second pressure, and the lubrication system configured to provide the boost supply fluid flow to at least one said component independently of the supply fluid flow.

8. The gas turbine engine of claim 7, wherein the boost pump is driven by a mechanical power source directly or indirectly in communication with the shaft.

9. The gas turbine engine of claim 8, wherein, when the boost pump is in an active state, the boost pump is configured to continuously produce the boost supply fluid flow at the third pressure at the second fluid flow exit port.

10. The gas turbine engine of claim 9, wherein the boost pump system includes a bypass valve; and the boost pump is configured to selectively direct at least a portion of boost supply fluid flow through the bypass valve and out of the boost pump system at a position upstream of the bearing compartment.

11. The gas turbine engine of claim 7, wherein the boost pump is driven by an independent power source, and the boost pump is selectively controllable to an active state where the boost pump continuously produces the boost supply fluid flow at the third pressure at the second fluid flow exit port, or to an inactive state where the boost pump is not operating.

12. The gas turbine engine of claim 11, wherein the boost pump is at least one of pneumatically, electrically, or hydraulically powered.

13. The gas turbine engine of claim 7, wherein the fluid damped structure is disposed within the bearing compartment and configured to permit radial movement of the bearing within the bearing compartment.

* * * * *